(12) United States Patent
Moreau et al.

(10) Patent No.: US 8,973,220 B2
(45) Date of Patent: Mar. 10, 2015

(54) FLOATING CABLE TIE

(76) Inventors: Darrell A. Moreau, Manchester, NH (US); Andre W. Moreau, Spring Hill, FL (US)

(*) Notice: Subject to any disclaimer, the term of this patent is extended or adjusted under 35 U.S.C. 154(b) by 194 days.

(21) Appl. No.: 13/545,028

(22) Filed: Jul. 10, 2012

(65) Prior Publication Data

US 2014/0013547 A1    Jan. 16, 2014

(51) Int. Cl.
| | |
|---|---|
| *B65D 63/14* | (2006.01) |
| *B29C 65/08* | (2006.01) |
| *B65D 63/00* | (2006.01) |
| *F16L 3/233* | (2006.01) |
| *B65D 63/10* | (2006.01) |
| *B65D 63/18* | (2006.01) |

(52) U.S. Cl.
CPC ............... *F16L 3/2334* (2013.01); *Y10T 24/14* (2015.01); *Y10T 24/1498* (2015.01); *B65D 63/1072* (2013.01); *B65D 63/18* (2013.01)
USPC ...................................... 24/16 PB; 24/17 AP

(58) Field of Classification Search
USPC .......................................... 24/16 PB, 17 AP
See application file for complete search history.

(56) References Cited

U.S. PATENT DOCUMENTS

| | | | | |
|---|---|---|---|---|
| 3,954,295 | A * | 5/1976 | Harley | 292/319 |
| 4,009,509 | A | 3/1977 | McCormick | |
| 5,123,686 | A * | 6/1992 | Wenk | 292/321 |
| 5,690,522 | A | 11/1997 | Moreau | |
| 7,871,693 | B2 * | 1/2011 | Laporte et al. | 428/212 |
| 7,935,412 | B2 * | 5/2011 | Laporte et al. | 428/212 |
| 2003/0159254 | A1 * | 8/2003 | Wendle | 24/16 PB |
| 2007/0226960 | A1 * | 10/2007 | Laporte et al. | 24/16 PB |

* cited by examiner

*Primary Examiner* — Robert J Sandy
*Assistant Examiner* — Rowland Do
(74) *Attorney, Agent, or Firm* — Mesmer & Deleault PLLC

(57) ABSTRACT

A cable tie device has a float portion with a peripheral wall that defines and encloses an internal hollow region with a pre-defined volume. The device also has a head with a passageway therethrough and a resilient catch mechanism disposed in the passageway. A strap connects to the head and has a plurality of cavities in a top surface for engaging the resilient catch mechanism. The float portion is connected to at least one of the head and the strap where the float portion head, resilient catch mechanism, and strap form a cable tie. A method of making is also disclosed.

18 Claims, 8 Drawing Sheets

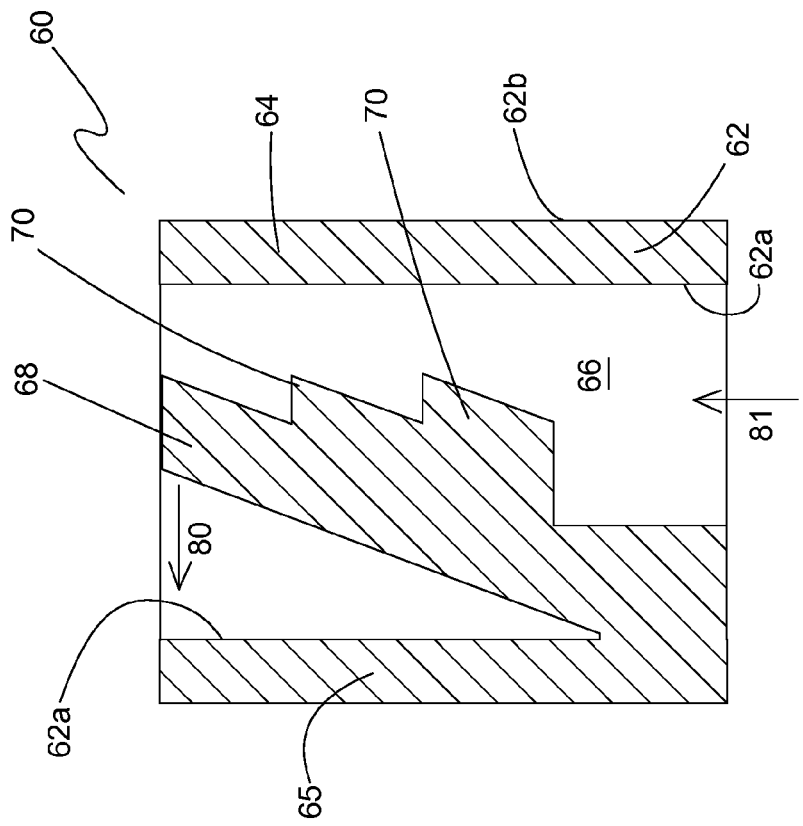
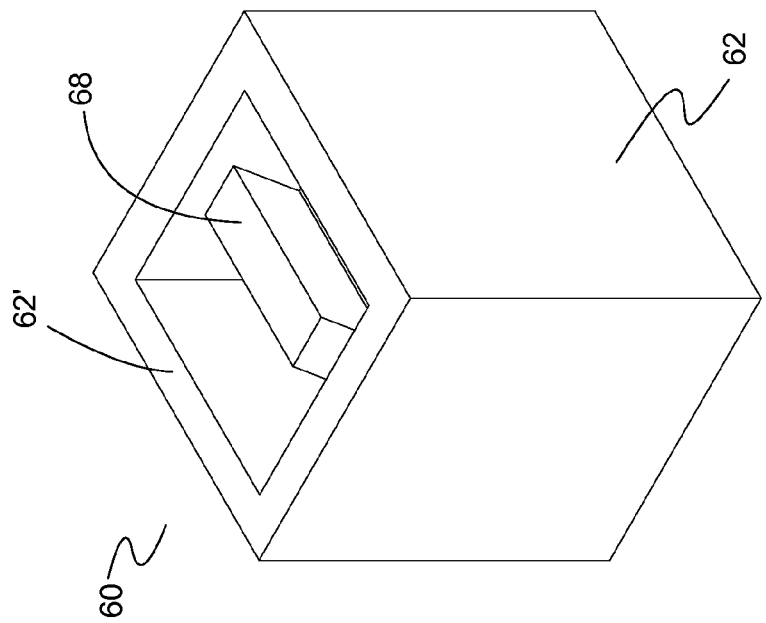
Fig. 7
Fig. 6

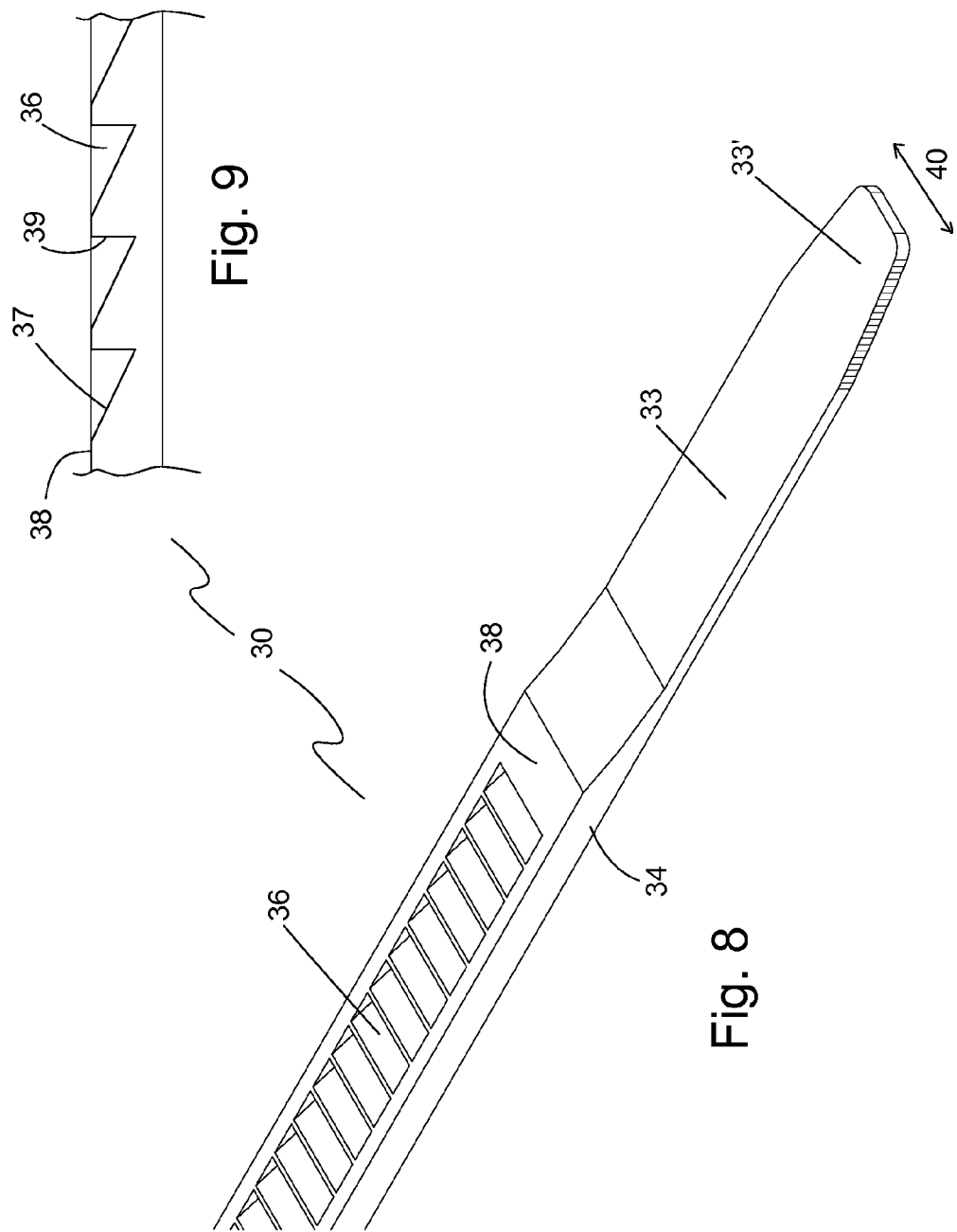

FLOATING CABLE TIE

BACKGROUND OF THE INVENTION

1. Field of the Invention

The present invention relates generally to fastening devices. Particularly, the present invention relates to a cable tie device and more particularly to a floating cable tie device.

2. Description of the Prior Art

Cable ties (e.g., illustrated in U.S. Pat. No. 4,009,509 to McCormick, 1977) are the predominate fastener used for securing various components such as cables, wires, tooling, hoses, radiation shielding, barriers, and the like. These components are some that are located within a foreign material exclusion zone (FMEZ) at Nuclear Power Stations. Within the FMEZ there are open systems and components which include the reactor cavity, refueling pool, and reactor vessel. These open systems or components contain water up to 90 feet deep with intricate components beneath. It is important to prevent introduction of any foreign materials into the open systems, including cable ties.

Although cable ties are excellent fasteners they do occasionally break, snap, or become unfastened. Breakage occurs because cable ties are typically made of plastic, which becomes brittle over time due to plasticizer leaching out of the plastic. Cable ties that have a specific gravity greater than one will sink in water.

Finding and retrieving a cable tie from open systems at nuclear power stations or other sites is time consuming, expensive, and may require taking a plant off-line. Searches for lost cable ties include visual inspections with underwater telescopes or remotely-controlled miniature submarines (mini-subs). Once the cable tie is located, retrieving the cable tie may require using mini-subs with claws, long-handled tooling with claws, or underwater vacuums. This entire process consumes several man hours and may cost thousands of dollars. Also, when lost cable ties are located in a radiation field, the search and retrieval process exposes plant workers to additional radiation, which is heavily regulated and scrutinized by regulatory commissions.

When the cable tie is declared lost at a nuclear facility, the particular section of the power station is taken off line and an engineering assessment is performed to determine whether any detrimental effects will occur if the cable tie remains in the plant systems. This assessment requires several additional man hours and can cost thousands of dollars in engineering costs. These costs do not include the costs involved with delaying the power station from coming back on line to produce electricity.

One invention that addresses this problem is described in U.S. Pat. No. 5,690,522 issued in 1997 to Moreau. The '522 patent discloses a cable tie flotation device for making a cable tie buoyant. The flotation device has a volume of resilient, easily deformable material with an opening therethrough. The deformable material has a specific gravity of less than one and, when added to the cable tie, is sufficiently buoyant to keep the cable tie afloat in a liquid medium. The flotation device, however, must be added to a cable tie by deforming the device and slipping it over the tip of the elongated strap of the cable tie. The flotation device must then be positioned proximate the head of the cable tie to make the cable tie operable.

SUMMARY OF THE INVENTION

As described above, the prior art lacks a cable tie device that remains buoyant in water without the need for a separate flotation device. Cable ties of the prior art use an attachable flotation device that interferes with operation of the cable tie and requires assembly of the flotation device and the cable tie.

Accordingly, a need exists for a floating cable tie with an integral float that is positioned outside of the area circumscribed by the cable tie in its closed or fastened position.

In this specification "peripheral wall" means the outermost part or region of a delineated boundary that defines a hollow region or space within the delineated boundary and, if the delineated boundary includes one or more openings, then the planes tangent to the one or more openings are considered part of the delineated boundary.

It is an object of the present invention to provide a cable tie device that will remain buoyant when it is introduced into water.

It is another object of the present invention to provide a cable tie device that will not impede with the usefulness of the cable tie.

It is another object of the present invention to provide a cable tie that is easy to handle by a user wearing radiation protective clothing.

The present invention achieves these and other objectives by providing a cable tie device having an elongated strap, a head, and a float portion. In one embodiment, the floating cable tie device has a float portion with a peripheral wall that defines and forms an internal hollow region with a pre-defined volume. The device also has a head having a passageway therethrough and a resilient catch mechanism disposed in the passageway. A strap is connected to the head and has a plurality of cavities in a top surface for engaging the resilient catch mechanism. The float portion is connected to at least one of the head and the strap. The float portion, head, resilient catch mechanism, and strap form a cable tie.

In another embodiment of the invention, the volume of the internal hollow region is sized to maintain the cable tie device afloat in a liquid.

In another embodiment of the invention, the peripheral wall comprises a top, a perimeter sidewall, and a bottom.

In another embodiment of the invention, the floating cable tie device has a flotation device disposed in the hollow region. The flotation device is a component formed from one or more materials such as silicone, polyethylene, polypropylene, rubber, ethylene-propylene-dyene monomer, and closed-cell foam.

In another embodiment of the invention, the perimeter sidewall has one or more protrusions or tabs extending towards the internal hollow region from the perimeter sidewall for retaining the flotation device within the hollow region.

In another embodiment of the invention, the peripheral wall defines at least one opening.

In another embodiment of the invention, the peripheral wall includes a perimeter wall, a top, and a bottom where at least one of the top and the bottom is a mesh.

In another embodiment of the invention, the cable tie device has a specific gravity less than one.

In another embodiment of the cable tie device, the float portion extends along a longitudinal float axis of the float portion. A longitudinal head axis extends through the head in a longitudinal direction parallel to the strap and perpendicular to the passageway, where an angle A measured between the longitudinal float axis and the longitudinal head axis is between about 90 and about 180°. Preferably, angle A is about 50°.

In a method of making a cable tie device, the method includes forming a float portion having a peripheral wall defining a hollow region, forming a head having a passageway therethrough, forming a resilient catch mechanism disposed in the passageway, forming an elongated strap having a plurality of cavities capable of engaging the resilient catch mechanism, connecting the elongated strap to the head, and connecting the float portion to at least one of the head and the strap.

In another embodiment of the method, the step of forming a float portion having a peripheral wall includes the step of forming a perimeter sidewall.

In another embodiment of the method, the step of forming a float portion having a peripheral wall includes forming a perimeter sidewall having a top wall end and forming a bottom that extends across a bottom wall end of the perimeter sidewall. The method may also include the step of connecting a top across a top wall end of the perimeter sidewall. In one embodiment, connecting the top across a second end of the perimeter sidewall is performed by at least one of ultrasonic welding, thermal welding, solvent welding, use of an adhesive, use of a snap-fit device, and use of a fastener.

In another embodiment of the method, the steps of forming a perimeter sidewall, forming a bottom extending across a first end of the perimeter sidewall, and connecting a top across a second end of the perimeter sidewall include sealing a quantity of gas within the hollow region of the float portion.

In one embodiment of the method, the method includes the step of defining at least one opening in the peripheral wall.

In one embodiment of the method, the method includes the step of disposing a flotation device into the hollow region. The flotation device may be made of silicone, polyethylene, polypropylene, rubber, ethylene-propylene-dyene monomer, and/or closed-cell foam.

BRIEF DESCRIPTION OF THE DRAWINGS

FIG. 6 illustrates an enlarged perspective view of one embodiment of a head of the floating cable tie device of the present invention.

FIG. 7 illustrates a side cross-sectional view of the head of FIG. 6.

FIG. 8 illustrates an enlarged perspective view of a distal portion of an elongated strap of the cable tie device of FIG. 1 showing a tapered end.

FIG. 9 illustrates a side cross-sectional view of part of the strap of FIG. 8 showing cavities.

DETAILED DESCRIPTION OF THE PREFERRED EMBODIMENT

Figure 1:
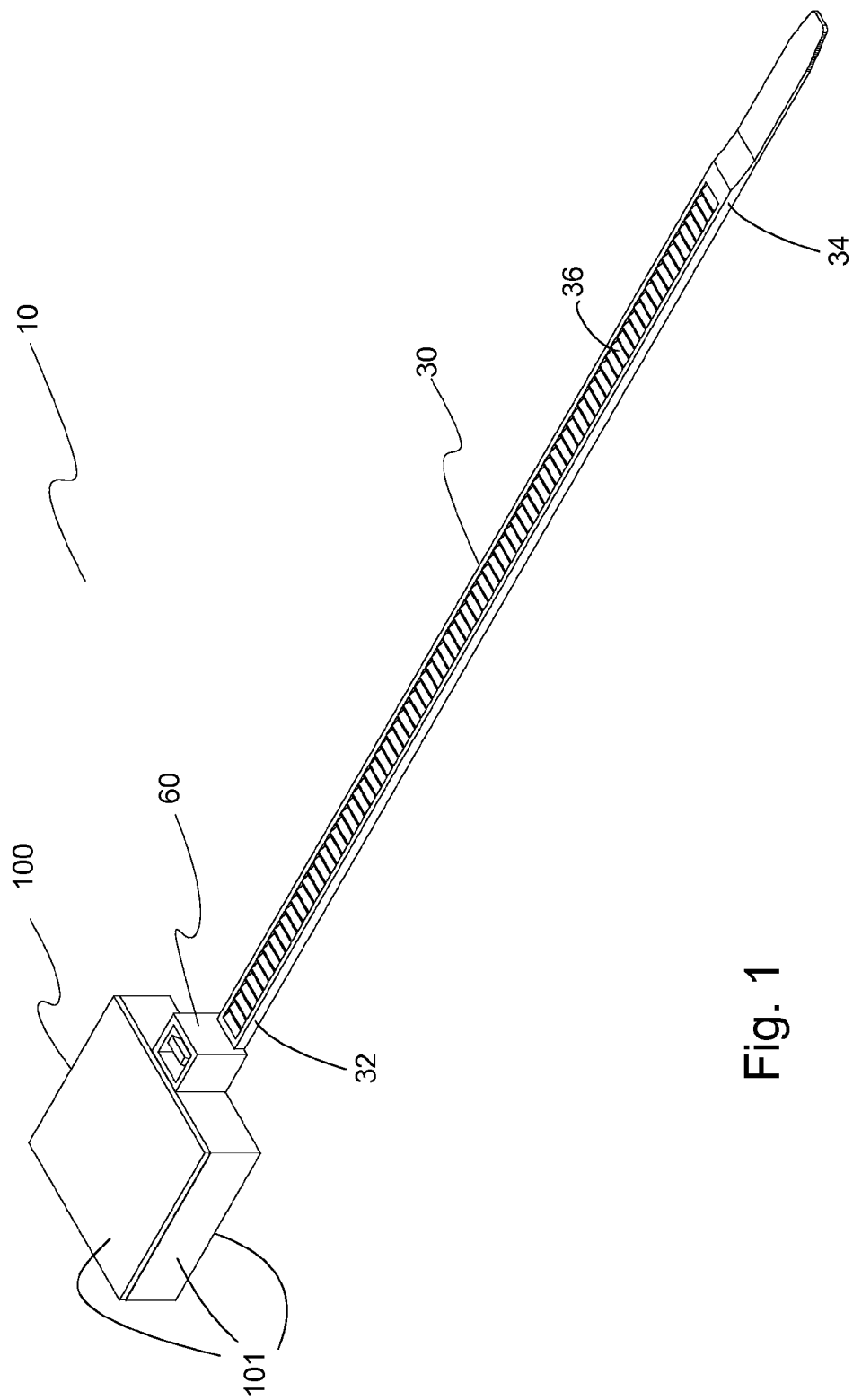
FIG. 1 illustrates a perspective view of one embodiment of a cable tie device of the present invention.

The preferred embodiment of the present invention is illustrated in FIGS. 1-11. FIG. 1 illustrates a perspective view of one embodiment of a floating cable tie device 10. Floating cable tie device 10 has an elongated strap 30 with a proximal end 32, a distal end 34, and a plurality of cavities 36. A head 60 connects to the proximal end 32 of strap 30. A float portion 100 connects to head 60. Float portion 100 has a peripheral wall 101 that defines a hollow region 108 (not shown).

Figure 2:
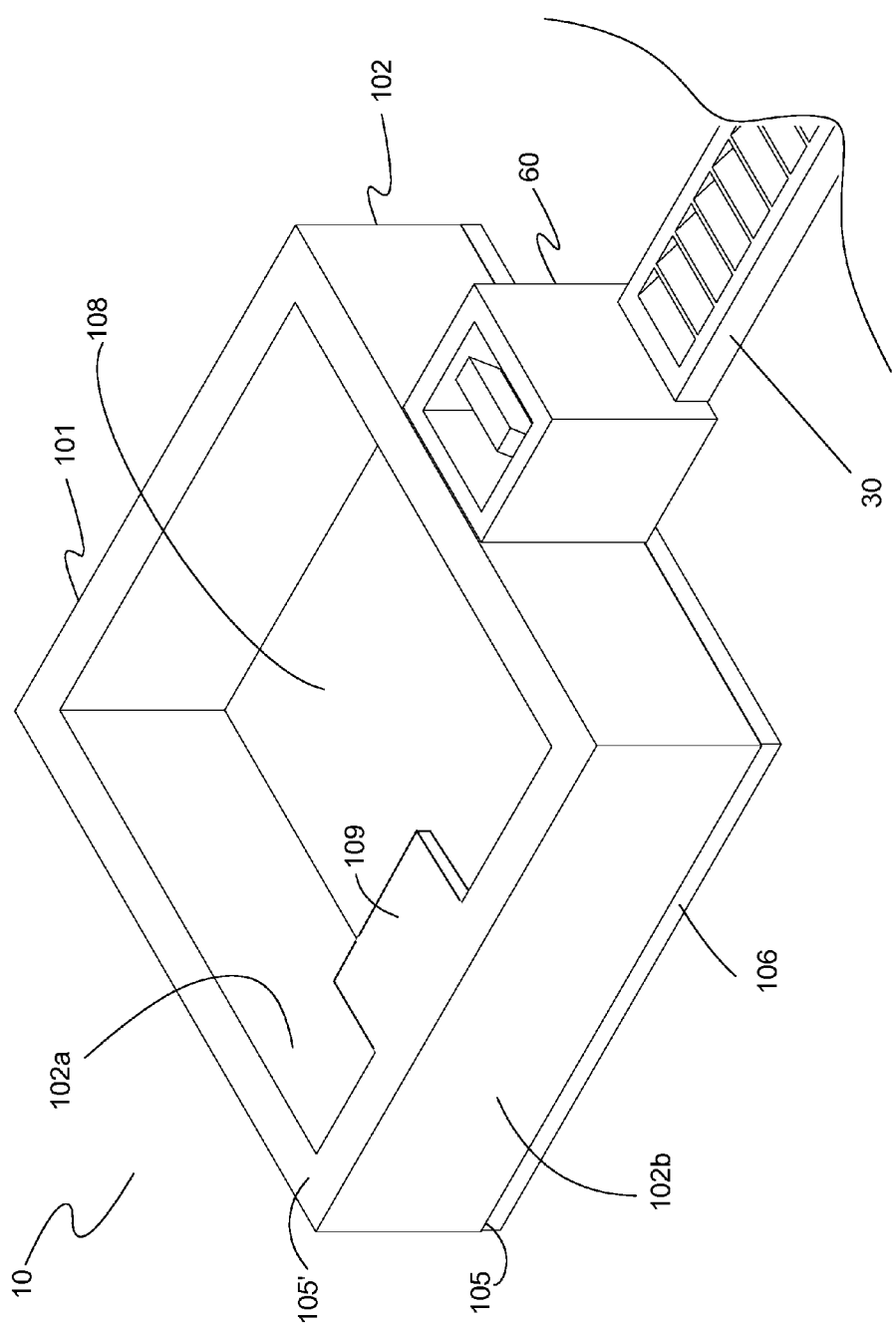
FIG. 2 illustrates an enlarged perspective view of another embodiment of a float portion (without top) connected to a head and a strap of a floating cable tie device of the present invention and showing an optional retaining tab extending from the peripheral wall toward the hollow region.

FIG. 2 illustrates one embodiment of float portion 100 of floating cable tie device 10. In this embodiment, float portion 100 is a box-shaped enclosure connected to head 60 of device 10. In this embodiment, peripheral wall 101 of float portion 100 includes a perimeter sidewall 102, top 104 (not shown), bottom 106, and an optional tab 109. Perimeter sidewall 102 has an inside surface 102a, an outside surface 102b, a bottom wall end 105, and a top wall end 105'. Top 104 (not shown) and/or bottom 106 are secured to or formed integral with perimeter sidewall 102 to define and enclose a hollow region 108 with a pre-defined volume. As shown in FIG. 2, one or more optional tabs 109 may be used instead of or with top 104 and/or bottom 106 when floating cable tie device 10 includes an optional flotation device 150 (not shown) as will be described more fully below.

Preferably, cable tie 10 is manufactured using an injection molding process to create float portion 100 as an open-top box as shown in FIG. 2 that is connected to head 60 and strap 30 of floating cable tie device 10. The open top or top wall end end 105' of head 100 is then sealed closed with top 104 that extends across bottom wall end 105 (shown in FIGS. 1 & 4). Top 104 is preferably attached with ultrasonic welding, but may be attached with other methods such as solvent welding, snap fit, thermal welding, fasteners, and the like.

In one embodiment, top 104 and bottom 106 are solid surfaces that are unitary with perimeter sidewall 102 to enclose and seal a quantity of gas (e.g., air) within hollow cavity 108. For example, float portion 100 may be manufactured as a single, closed structure with hollow cavity 108. In other embodiments, perimeter sidewall 102 of float portion 100 defines a rectangular ring, annulus, or other closed geometry. Top 104 and/or bottom 106 are then fixedly and sealingly attached to perimeter sidewall 102 with an ultrasonic weld to form an air-tight enclosure that contains a quantity of air. Similarly, a cap, cover, plug, or other device may be used to close an open top or other opening in float portion 100.

In another embodiment, float portion 100 may optionally contain a floatation device 150 (not shown) within hollow region 108. In one embodiment, flotation device 150 is flexible rubber-like closed-cell foam such as Ethylene-Propylene-Dyene-Monomer (EPDM). One particular EPDM float material is Royalene 4243 available from Universal Rubber Company in Dawsonville, Ga. EPDM is one of several materials that could be used for flotation device 150. Other closed cell foam materials such as silicone, polyethylene, polypropylene, rubber, foams, and the like could also be used as well as any other material that provides buoyancy to floating cable tie device 10. To retain flotation device 150 within hollow region 108, perimeter wall 102 may be covered with a top 104 and a bottom 106 or incorporate one or more tabs 109 at top wall end 105' and bottom wall end 105 or a combination of top 104, bottom 106, and tabs 109.

Figure 3:
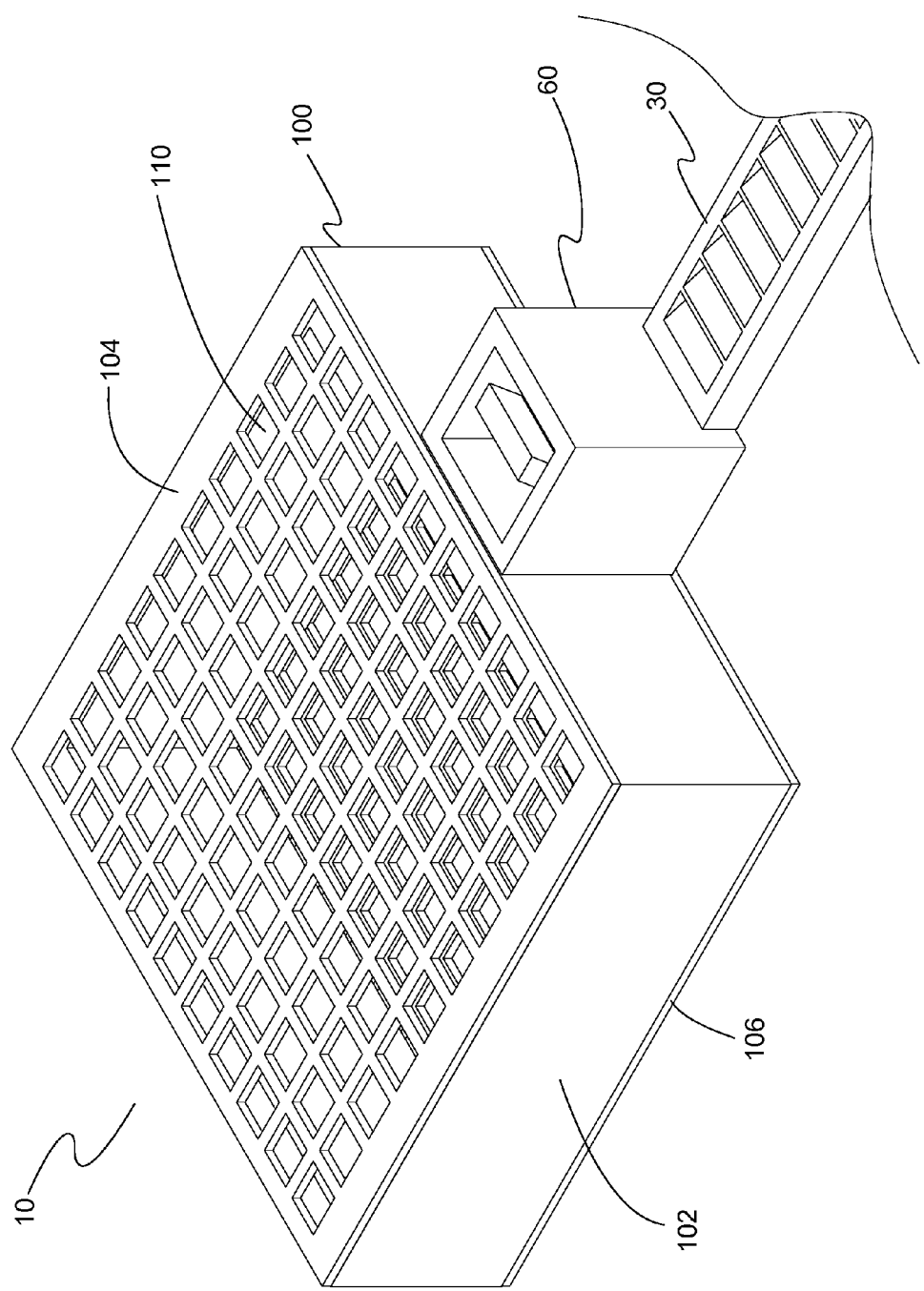
FIG. 3 illustrates a perspective view of another embodiment of a float portion connected to a head and a strap of a floating cable tie device of the present invention showing a top with a plurality of openings.

FIG. 3 illustrates an alternate embodiment of floating cable tie device 10 used with flotation device 150. In embodiments where a flotation device 150 is used, top 104 and/or bottom 106 of float portion 100 may have one or more openings 110 to reduce the overall mass of floating cable tie device 10 and to permit fluids to flow through float portion 100. For example, top 104 and/or bottom 106 may be a polypropylene mesh or other perforated material that is fused, welded, adhered, or otherwise attached to perimeter sidewall 102 to retain flotation device 150 within hollow region 108. Similarly, a mesh or cover may be attached over one or more open regions of perimeter sidewall 102 or peripheral wall 101 to retain a flotation device 150 within float portion 100. In another embodiment, one or more protrusions or tabs 109 extend inwardly from perimeter sidewall 102 to retain flotation device 150. A protrusion or tab 109 extending inwardly from perimeter sidewall 102 is one, for example, that extends towards hollow region 108 or towards extensions of hollow region 108 along an axis perpendicular to the planar area enclosed by perimeter sidewall 102. Protrusions or tabs 109 may be rigid, resilient, flexible, or have a combination of these properties so long as tab 109 retains flotation device 150 within hollow region 108. Perimeter sidewall 102 may also have a plurality of openings since flotation device provides the required buoyancy.

Figure 4:
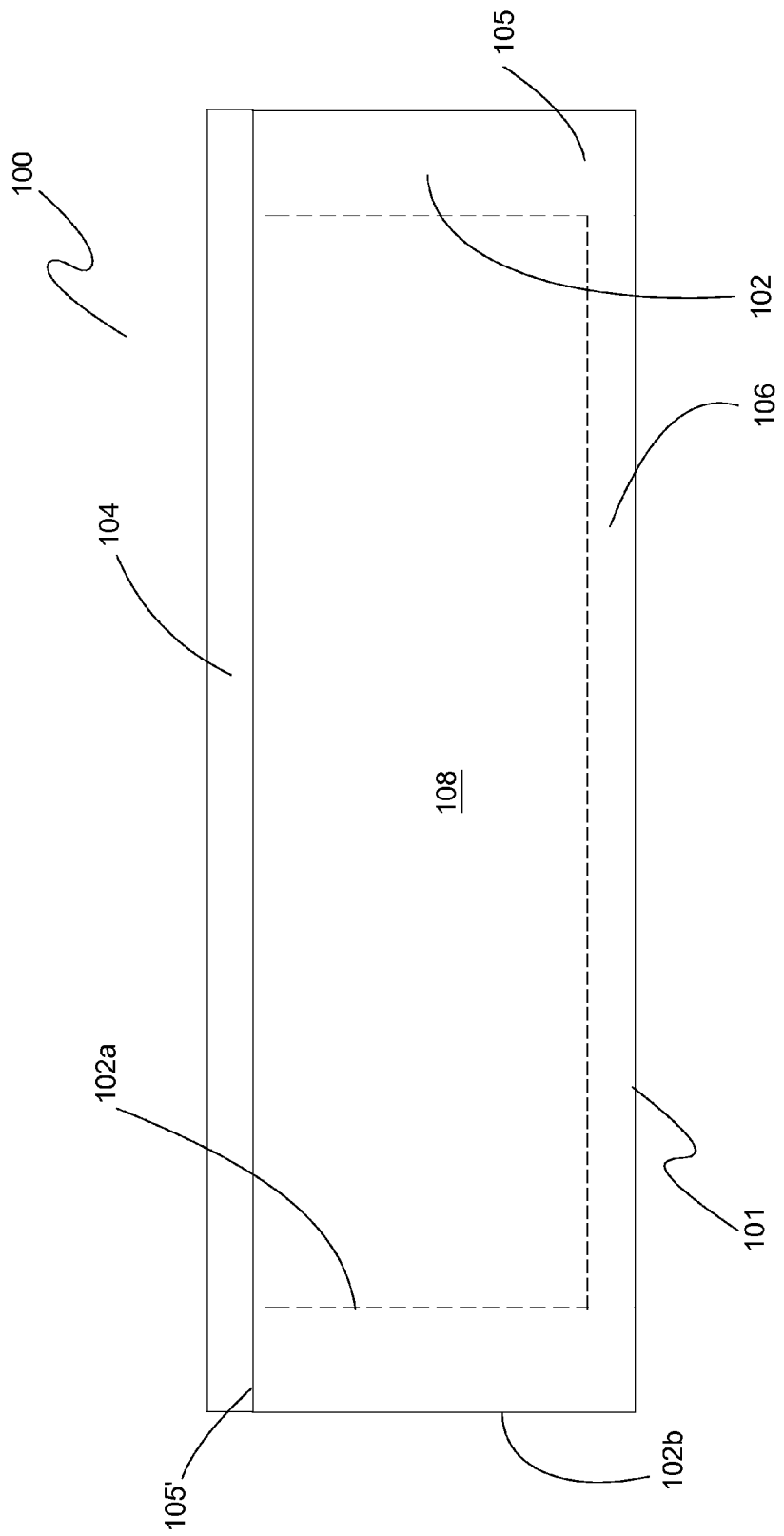
FIG. 4 illustrates a side view of one embodiment of a float portion of a floating cable tie device of the present invention showing a perimeter wall, a top, and a bottom.

FIG. 4 illustrates a side view of one embodiment of float portion 100. Peripheral wall 101 includes perimeter sidewall 102 with outside surface 102b and inside surface 102a. Peripheral wall 101 also includes bottom 106 extending across a bottom wall end 105 of perimeter sidewall 102 and top 104 extending across a top wall end 105' of perimeter sidewall 102. Either or both of top 104 and bottom 106 are attached to or formed with perimeter sidewall 102 to enclose hollow region 108. In one embodiment, float portion 100 is rectangular in shape, but float portion 100 may define a cylinder, sphere, or other geometries.

Figure 5:
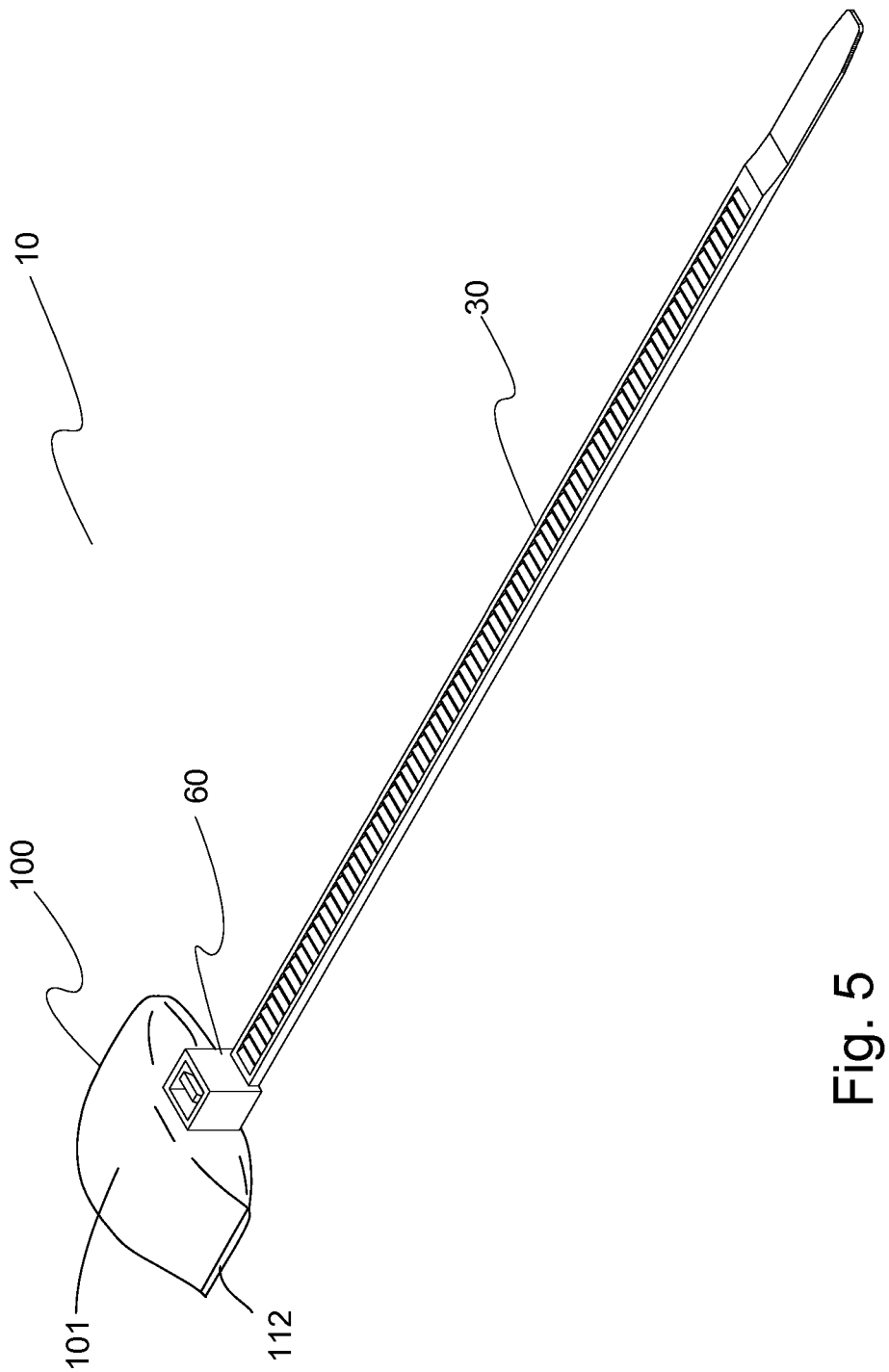
FIG. 5 illustrates a further embodiment of cable tie device having a pillow-like float portion.

As illustrated in FIG. 5, for example, float portion 100 in another embodiment has a pillow-like structure (e.g., a tube) with a peripheral wall 101 and one or more ends 112. End(s) 112 may be crimped or otherwise closed to seal a quantity of air inside pillow-like float portion 100. If a flotation device 150 is used, it may be inserted into float portion 100 through an open end 112 and end(s) 112 of float portion 100 subsequently crimped or otherwise closed, partially closed, or have one or more tabs 109 to retain flotation device 150 within float portion 100.

FIGS. 6 and 7 illustrate an enlarged perspective view and side sectional view, respectively, of an embodiment of head 60. Head 60 has wall 62 with an inner surface 62a and an outer surface 62b. Wall 62 defines a passageway 66 through head 60. A catch mechanism 68 extends from a first portion 65 of wall 62 into passageway 66. Catch mechanism 68 preferably has one or more teeth 70 that engage cavities 36 in strap 30 when strap 30 passes through passageway 66 between catch mechanism and second portion 64 of wall 62. Catch mechanism 68 is positioned within passageway 66 so that one end is displaced or bent in a direction (shown by arrow 80) by strap 30 passing in a direction shown by arrow 81 through passageway 66. Floating cable tie device 10 is preferably made of a resilient material. Thus, displacing catch mechanism 68 results in a bias towards strap 30 that causes teeth 70 to engage cavities 36 in strap 30. In one embodiment, cross section 62' of body wall 62 is substantially rectangular, but may also be circular, oval, or other shape so long as it accommodates the geometry of strap 30.

FIG. 8 illustrates an enlarged perspective view of distal end 34 of strap 30. Strap 30 is an elongated strip with a preferably tapered distal end 34 and a plurality of cavities 36 along its top surface 38. Distal end 34 preferably tapers in thickness to form tip 33 that more easily feeds into passageway 66 of head 60. Tip 33 also preferably tapers in width 40 at the end 33' of tip 33 for ease of feeding through passageway 66.

FIG. 9 illustrates a partial side sectional view of the strap 30 shown in FIG. 8. Cavities 36 are shaped to accept teeth 70 of head 60 and preferably correspond in shape and spacing to that of teeth 70. Cavities 36 are preferably wedge-shaped and have a sloping surface 37 and a catch surface 39 as illustrated in FIG. 9. Cavities 36 may extend partially or completely across width 40 of strap 30. Cavities 36 may also extend partially (e.g, defining recesses) or completely through (e.g., defining holes) strap 30. When strap 30 passes tip-first through passageway 66 of head 30, sloping surface 37 deflects catch mechanism 68 to allow strap 30 to continue through passageway 66. In the reverse direction, catch surface(s) 39 engage one or more teeth 70 to lock strap 30 in position against inside surface 62a of second portion 64 of wall 62 (see FIG. 7) and to prevent strap 30 from being removed from head 60. Thus, floating cable tie device 10 is capable of forming a secure closed loop.

Figure 11:
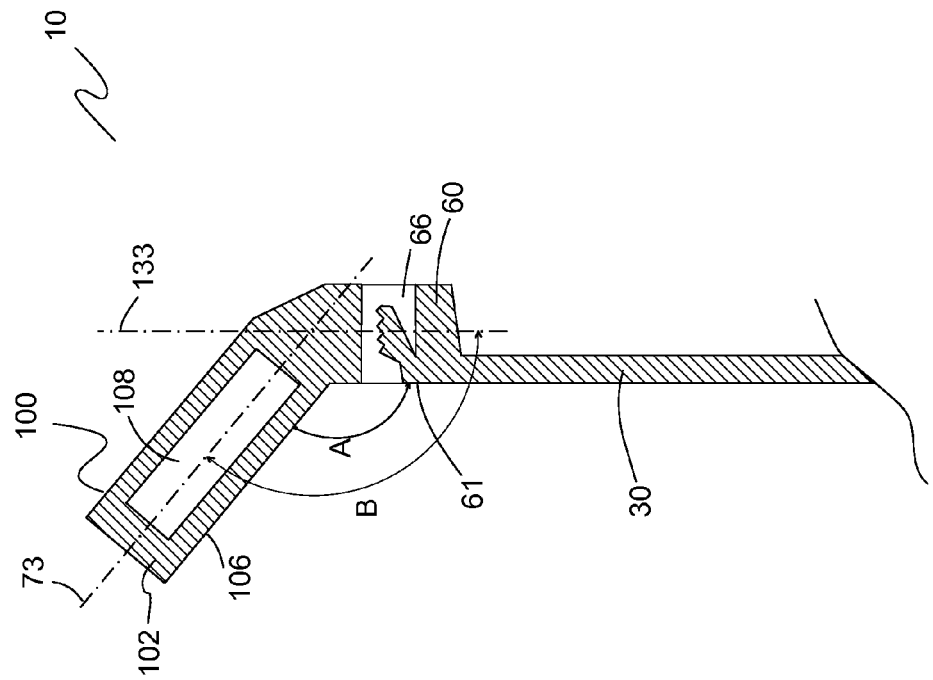
FIG. 11 illustrates a partial side cross-sectional view of the embodiment of a floating cable tie device shown in FIG. 10 showing the float portion and the head.
Figure 10:
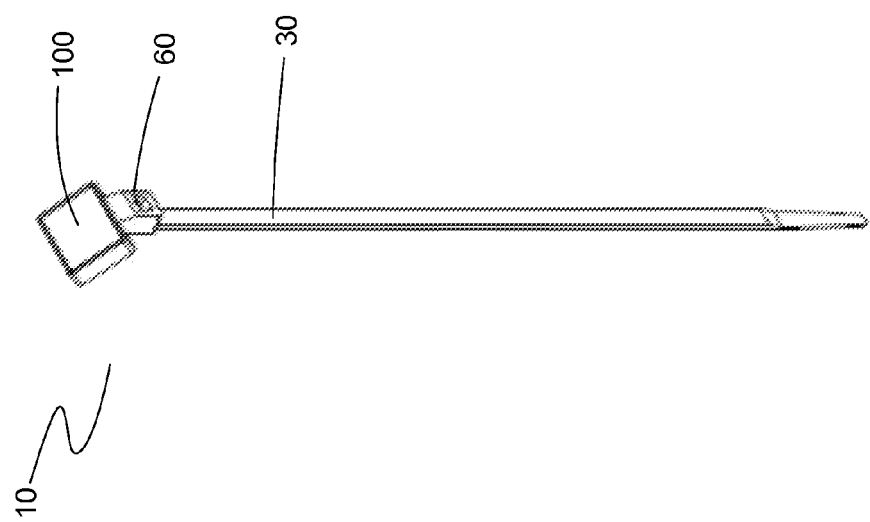
FIG. 10 illustrates a perspective view of another embodiment a floating cable tie device of the present invention showing the float portion at an angle with respect to the head and the strap.

FIGS. 10 and 11 illustrate an alternate embodiment of floating cable tie device 10. FIG. 10 shows a perspective view of floating cable tie device 10 where float portion 100 is angled with respect to head 60 and strap 30. As illustrated more clearly in the side cross-sectional view in FIG. 11, float portion 100 extends from head 60 at an angle "A" measured between bottom 106 of float portion 100 and a bottom surface 61 of head 60. Angle A is preferably between about 90 and about 180 degrees. In the preferred embodiment, angle A is about 50°. In another embodiment, bottom 106 of float portion 100 and bottom surface 61 of head 60 are curved or arcuate for more closely wrapping around cylindrical objects. In some embodiments, an angle "B" is measured between a longitudinal float axis 133 and a longitudinal head axis 73. Angle B is also preferably between 90 and 180 degrees. Longitudinal float axis 133 extends longitudinally along a centerline through perimeter sidewall 102 and hollow region 108 in the direction in which float portion 100 extends from head 60. Longitudinal head axis 73 extends longitudinally along a centerline through wall 62 of head 60, which is parallel to the longitudinal direction of strap 30.

A method of making a floating cable tie device 10 includes the steps of forming a float portion 100 having a peripheral wall 101 that defines a hollow region 108, forming a head 60 having an passageway 66 therethrough, forming a resilient catch mechanism 68 disposed in the passageway 66; forming a strap 30 having a plurality of cavities 36 capable of engaging the resilient catch mechanism 68, connecting the strap 30 to the head 60, and connecting the float portion 100 to at least one of the head 60 and the strap 30.

Optionally, the method further includes forming a first surface or bottom 106 connected across a bottom wall end 105 of perimeter sidewall 102. A second surface or top 104 is attached or formed across top wall end 105' of perimeter sidewall 102 to close or partially close float portion 100. The method may also optionally include inserting a flotation device 150 comprising buoyant material into hollow region 108 of float portion 100. In a further embodiment of the method that includes flotation device 150, the method includes forming openings in top 104, bottom 106, or other portions of peripheral wall 101.

Float portion 100, head 60, and strap 30 are preferably formed as a unitary structure using plastic injection molding. In one embodiment of making floating cable tie device 10, float portion 100 initially has bottom 106, but no top 104 as shown in FIG. 2. To close float portion 100 and seal a quantity of gas within peripheral wall 101, top 104 is connected across top wall end 105' of perimeter sidewall 102 by ultrasonic welding. In other embodiments, portions of floating cable tie device 10 or float portion 100 may be joined using solvent welding, thermal welding, ultrasonic welding, adhesive, fasteners, or interlocking parts. In one embodiment, top 104 is connected by a snap fit to perimeter sidewall 102. A snap fit is a mechanical attachment between parts that may be achieved by tabs 109 extending from perimeter sidewall 102, a circumferential groove and mating flange, a detent and mating protrusion, a hook and catch, and other mechanisms or combinations thereof. Float portion 100 alternately may be attached to strap 30, such as connected to top surface 38 proximate to head 60.

To use device 10, a user feeds strap 30 through passageway 66 of head 60 in direction of arrow 81 to create a closed loop useful for securing objects. Engagement between teeth 70 of catch mechanism 68 and cavities 36 of strap 30 prevents strap 30 from being removed from head 60.

A user may additionally use float 100 as a handle or fob to facilitate handling floating cable tie device 10 and feeding strap 30 through head 60. When wearing radiation protective clothing, it is difficult for a user to handle small objects such as cable ties. The larger area of float portion 100 compared to strap 30 or ends of other cable tie devices makes handling cable tie device 10 less difficult. If device 10 is dropped or falls into water or other liquid, the buoyancy of float portion 100 maintains device 10 afloat for easy retrieval.

Float portion 100 preferably has a flat surface (e.g., top 104 and/or bottom 106) that enables one to apply labels or markings for identification and accountability purposes. Float portion 100 optionally has a writable surface to accept ink, pencil, wax (e.g., a grease pencil) and the like. Colored plastics may be used for parts of floating cable tie device 10 (e.g., top 104) or the device as a whole to make device 10 more visible and to allow for color coding. Alternately, flotation device 150 may be made of a brightly colored material that is visible through a mesh or through a solid transparent or semi-transparent float portion 100 material.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

We claim:

1. A cable tie device comprising:
a float portion having a peripheral wall defining a hollow region containing one or more of (i) a predefined quantity of gas sealed within the hollow region and (ii) a flotation device retained within the hollow region;
a head having a passageway therethrough;
a resilient catch mechanism disposed in the passageway of the head; and
a strap connected to the head and having a plurality of cavities in a top surface for engaging the resilient catch mechanism;
wherein the float portion is fixedly connected to at least one of the head and the strap, wherein the float portion, the head, the resilient catch mechanism, and the strap comprise a monolithic cable tie, and wherein a buoyancy of the one or more of the predefined quantity of gas and the flotation device is sufficient to maintain the cable tie afloat in a liquid.

2. The cable tie device of claim 1, wherein the peripheral wall comprises a perimeter sidewall with a top wall end and a bottom wall end, a top attached to the top wall end, and a bottom attached to the bottom wall end.

3. The cable tie device of claim 2, wherein one or more of the top, the bottom, and the perimeter sidewall is a mesh.

4. The cable tie device of claim 1, wherein the peripheral wall includes an opening therethrough.

5. The cable tie device of claim 1, wherein the cable tie device has a specific gravity less than one.

6. The cable tie device of claim 1, wherein the float portion extends along a longitudinal float axis that is transverse to a bottom surface of the strap immediately adjacent the head.

7. A cable tie device comprising:
a float portion having a peripheral wall defining a hollow region containing one or more of (i) a predefined quantity of gas sealed within the hollow region and (ii) a flotation device retained within the hollow region;
a head having a passageway therethrough;
a resilient catch mechanism disposed in the passageway of the head; and
a strap connected to the head and having a plurality of cavities in a top surface for engaging the resilient catch mechanism;
wherein the float portion is fixedly connected to at least one of the head and the strap, wherein the float portion, the head, the resilient catch mechanism, and the strap form a cable tie, and wherein a buoyancy of the one or more of the predefined quantity of gas and the flotation device is sufficient to maintain the cable tie afloat in a liquid;
wherein the peripheral wall comprises a perimeter sidewall and one or more tabs extending inwardly from the perimeter sidewall.

8. The cable tie device of claim 7, wherein the one or more tabs retain the flotation device within the hollow region.

9. The cable tie device of claim 8 wherein the flotation device is made of at least one material selected from the group consisting of silicone, polyethylene, polypropylene, rubber, ethylene-propylene-dyene monomer, and closed-cell foam.

10. A method of making a cable tie device, the method comprising the steps of:
forming a float portion having a peripheral wall that defines a hollow region;
forming a head with a passageway therethrough;
forming a resilient catch mechanism disposed in the passageway; and
forming an elongated strap having a plurality of cavities capable of engaging the resilient catch mechanism;
wherein the elongated strap extends from the head;
wherein the float portion is fixedly connected to at least one of the head and the elongated strap;
wherein the float portion, the head, the resilient catch mechanism, and the strap comprise a monolithic cable tie; and
wherein the float portion contains one or more of (i) a predefined quantity of gas sealed within the hollow region and (ii) a flotation device retained within the hollow region wherein a buoyancy of the one or more of the predefined quantity of gas and the flotation device is sufficient to maintain the cable tie afloat in a liquid.

11. The method of claim 10, wherein the step of forming the float portion having the peripheral wall comprises the step of forming a perimeter sidewall.

12. The method of claim 11, wherein the step of forming the float portion having the peripheral wall comprises:
forming a bottom extending across a first end of the perimeter sidewall.

13. The method of claim 12, further comprising the step of:
connecting a top across a second end of the perimeter sidewall.

14. The method of claim 13, wherein the steps of forming the perimeter sidewall, forming the bottom extending across the first end of the perimeter sidewall, and connecting the top across the second end of the perimeter sidewall includes sealing a quantity of gas within the hollow region of the float portion.

15. The method of claim 13, wherein the connecting step is performed by at least one of ultrasonic welding, thermal welding, solvent welding, use of an adhesive, and use of a fastener.

16. The method of claim 10 further comprising the step of:
forming at least one opening in the peripheral wall.

17. The method of claim 10, further comprising the step of:
disposing a flotation device into the hollow region.

18. The method of claim 17, wherein the step of disposing the flotation device into the hollow region includes selecting a flotation device comprising at least one material selected from the group consisting of silicone, polyethylene, polypropylene, rubber, ethylene-propylene-dyene monomer, and closed-cell foam.

* * * * *